United States Patent [19]
Ashikawa et al.

[11] Patent Number: 4,606,243
[45] Date of Patent: Aug. 19, 1986

[54] HOUSING FOR A DRIVING GEAR FOR ALL-WHEEL-DRIVE VEHICLES

[75] Inventors: Noboru Ashikawa, Sayama, Japan; Karl Friedrich, Leibnitz; Herwig Leinfellner, Graz, both of Austria

[73] Assignee: Honda Giken Kogyo Kabushiki Kaisha, Tokyo, Japan

[21] Appl. No.: 657,544

[22] Filed: Oct. 4, 1984

[30] Foreign Application Priority Data

Oct. 5, 1983 [JP] Japan .................................. 58-186091

[51] Int. Cl.$^4$ ...................... F16H 37/08; F16H 57/02
[52] U.S. Cl. ...................................... 74/700; 180/249; 74/606 R
[58] Field of Search ................. 74/714, 710, 701, 700, 74/606 R; 180/248, 249, 250

[56] References Cited

U.S. PATENT DOCUMENTS

| | | | |
|---|---|---|---|
| 3,627,072 | 12/1971 | Smirl | 180/249 |
| 4,308,763 | 1/1982 | Brisabois | 74/700 |
| 4,364,285 | 12/1982 | Morisawa et al. | 74/606 R |
| 4,441,575 | 4/1984 | Suzuke | 180/250 X |
| 4,499,791 | 2/1985 | Brisabois | 74/700 |
| 4,520,690 | 6/1985 | Dangel | 180/249 X |

FOREIGN PATENT DOCUMENTS 2074516 11/1981 United Kingdom ................ 180/249

Primary Examiner—Kenneth J. Dorner
Assistant Examiner—Dirk Wright
Attorney, Agent, or Firm—Armstrong, Nikaido, Marmelstein & Kubovcik

[57] ABSTRACT

A driving gear for all-wheel-drive vehicles, comprises a transmission provided with a plurality of shafts parallel with an axis of a vehicle. An interaxle differential gear has an axis parallel with the shafts in the transmission and adapted to output the driving force from the transmission in a divided manner. An interwheel differential gear is provided concentrically with the interaxle differential gear and adapted to apply one output therefrom in a divided manner to right and left wheels which are closer to the transmission. A bevel gear train is interposed between a driving shaft and the interaxle differential gear. The driving shaft is provided so as to cross the axes of the two differential gears at right angles thereto and apply the other output from the interaxle differential gear to right and left wheels which are more distant from the transmission. Finally, a housing is provided in which all the parts are held. The housing consists of a combination of a plurality of sections of which all of the boundary surfaces extend in parallel with one another and at right angles to the axes of the shafts in the transmission.

2 Claims, 1 Drawing Figure

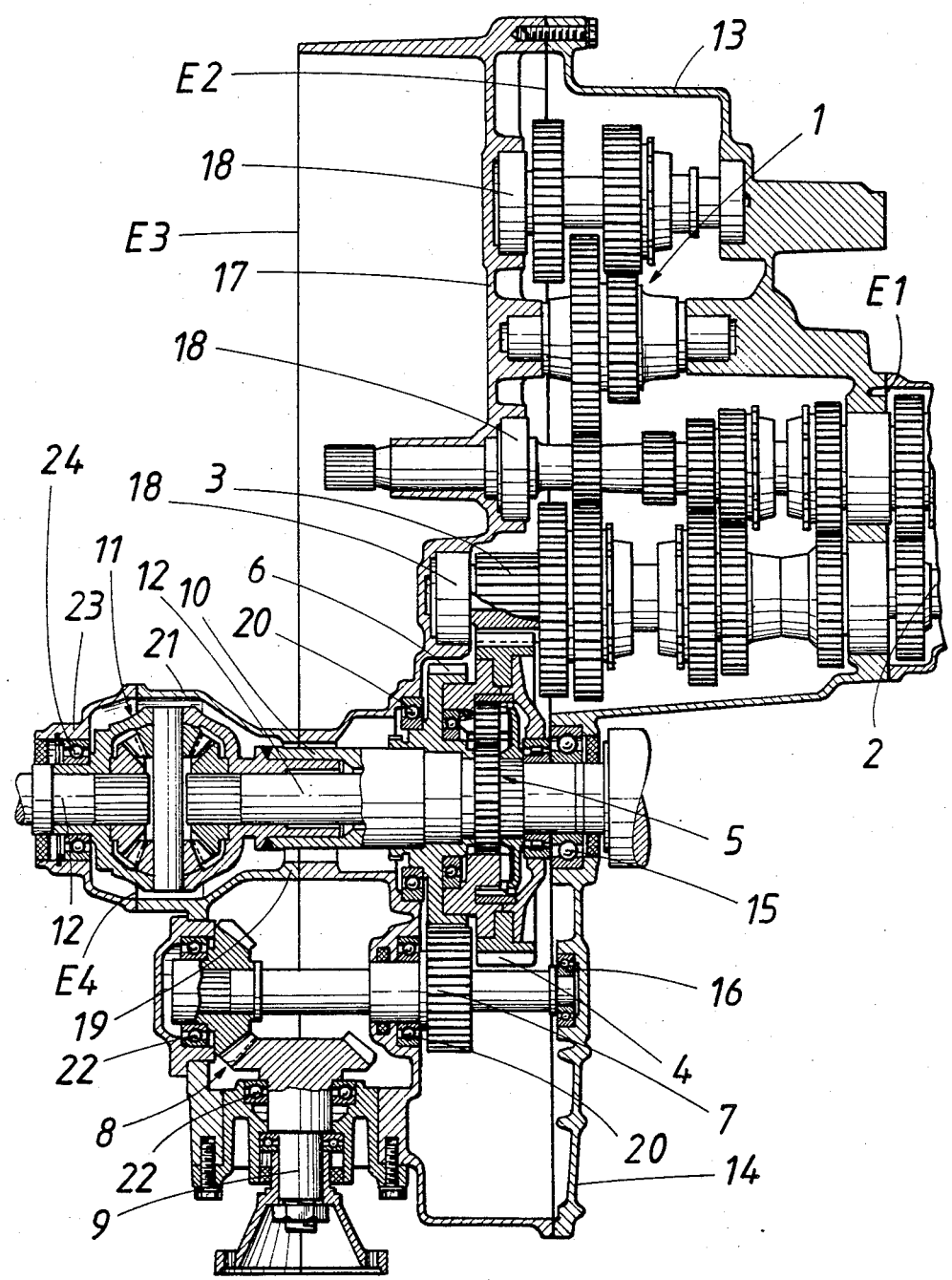

HOUSING FOR A DRIVING GEAR FOR ALL-WHEEL-DRIVE VEHICLES

BACKGROUND OF THE INVENTION

This invention relates to a driving gear for all-wheel-drive vehicles, and more particularly to a driving gear for all-wheel-drive vehicles, comprising a transmission provided with a plurality of shafts parallel with the wheel axles of the vehicle, an interaxle differential gear having an axis parallel with the shafts in the transmission and adapted to output the driving force from the transmission in a divided manner, an interwheel differential gear provided concentrically with the interaxle differential gear and adapted to apply one output therefrom in a divided manner to the right and left wheels which are closer to the transmission, a bevel gear train interposed between a driving shaft and the interaxle differential gear, the driving shaft being provided so as to cross the axes of the two differential gears at right angles thereto and apply the other output from the interaxle differential gear to the right and left wheels which are more distant from the transmission, and a housing in which all of the mentioned parts are held.

German application laid-open Patent Publication No. 3116411 discloses a driving gear of this kind, in which a boundary surface between a transmission-holding housing and its adjacent housing extends at right angles to the shafts in the transmission. In this driving gear, a housing surrounding the interaxle differential gear, the interwheel differential gear and the gear train is fixed to the adjacent housing, which is adjacent to the transmission-holding housing via a joint surface which extends at right angles to the mentioned shafts.

However, the housing surrounding the two differential gears and gear train in this driving gear is made of two parts having one boundary surface, in order to assemble the driving gear easily. The axes of the various shafts extend in the boundary surface. Consequently, this housing has a plurality of boundary surfaces extending at right angles to each other. This makes it difficult to maintain the assembling accuracy of the driving gear. It is also very difficult to properly seal the portions of the housings which contact each other at right angles.

OBJECT AND SUMMARY OF THE INVENTION

It is an object of the present invention to provide a driving gear for all-wheel-drive vehicles, which is free from the above-mentioned drawbacks encountered in a conventional driving gear of this kind, and which is capable of being assembled easily with an improved accuracy and sealed very easily.

In order to achieve this object, the housing in the present invention is formed by combining a plurality of sections, with all of their boundary surfaces extending in parallel with one another and at right angles to the axis of a transmission.

BRIEF DESCRIPTION OF THE DRAWINGS

The accompanying drawing is a side elevational view in cross section of an embodiment of the present invention.

DETAILED DESCRIPTION OF A PREFERRED EMBODIMENT

An embodiment of the present invention will now be described with reference to the drawing. A driving gear consists of a transmission 1 having a plurality of shafts 18 which are parallel with the wheel axles on a vehicle, an interaxle differential gear 5 adapted to divided the driving force from the transmission 1 and output the same to the front and rear axles of the vehicle in a divided manner, an interwheel differential gear 11 adapted to apply in a divided manner one output from the differential gear 5 to the right and left wheels which are closer to the transmission 1, for example, the right and left front wheels, a bevel gear train 8 and a pair of gears 6, 7, all of which are interposed between a driving shaft 9 and the interaxle differential gear 5, the driving shaft 9 extending at right angles to the axes of the differential gears 5, 11 so as to apply the other output from the interaxle differential gear 5 to the right and left wheels which are more distant from the transmission 1, for example, the right and left rear wheels, and a housing in which all of the mentioned parts are held.

The interaxle differential gear 5 is so disposed that the axis thereof extends in parallel with the shafts 18 in the transmission 1. The driving force from the transmission 1 is provided to the interaxle differential gear 5 via an output gear 3 mounted unitarily on an output shaft 2 in the transmission 1 and a reduction gear 4 formed unitarily with the differential gear 5. Although the whole of the gear train for various speeds in the transmission 1 is shown in the drawing, a gear-shift sleeve is not.

A hollow shaft 10, which constitutes one output end of the interaxle differential gear 5, extends in parallel with the shafts 18 in the transmission 1 and in the direction opposite to the direction in which the transmission 1 extends. The hollow shaft 10 is joined to the interwheel differential gear 11 of a bevel gear type construction. A pair of shorter driving shafts 12 for rotating the right and left front wheels extend from this interwheel differential gear 11. One shorter driving shaft 12 extends coaxially with and through the hollow shaft 10 and the interaxle differential gear 5 to project to the outside of the housing.

The gear 6, which constitutes the other output end of the interaxle differential gear 5, is meshed with the gear 7, which is joined to the driving shaft 9 via a bevel gear train 8.

The housing consist of three sections, i.e. the first, second and third sections 13,17,19 which are arranged along the axes of the shafts 18 in the transmission 1 from the transmission 1 toward the interwheel differential gear 11 in the mentioned order. All of the boundary surfaces E1, E2, E3, E4 of the sections 13, 17, 19 are parallel with one another and, moreover, at right angles to the axes of the shafts 18.

The first section 13 is so formed as to hold the transmission 1 therein, and extends toward the driving shaft 9 to form a wall 14. This wall 14 is provided thereon with a bearing 15 for supporting the interaxle differential gear 5 and one shorter driving shaft 12 and a bearing 16 for supporting the input shaft of the bevel gear train 8. The second section 17 is provided with a bearing 20 for supporting the interaxle differential gear 5 and hollow shaft 10. The third section 19 is formed to have a funnel-shaped portion 21 for holding the interwheel differential gear 11 therein, and is provided with other bearings 22. A cover 23 is fixed to the funnel-shaped portion 21 of the third section 19 and provided with one remaining bearing 24 for supporting the interwheel differential gear 11.

The operation of this embodiment will now be described. Since the boundary surfaces E1, E2, E3, E4 of the sections 13, 17, 19 are parallel with one another and at right angles to the axes of the shafts 18 in the transmission 1, the sections 13, 17, 19 can be cast easily. Moreover, they can be assembled easily with a greatly-increased accuracy. In addition, they can be sealed very easily at their parallel boundary surfaces E1, E2, E3, E4.

The first section 13 is enlarged to form the wall 14, on which the bearings 15, 16 are provided to support the interaxle differential gear 5 and the input shaft of the bevel gear train 8. The third section 19 is provided with the funnel-shaped portion 21, which holds the interwheel differential gear 11 therein, and which is closed with the cover 23 having the bearing 24 for supporting the differential gear 11 thereon. Accordingly, the driving gear as a whole can be assembled in due order from the transmission 1. This enables the driving gear-assembling work to be done much more easily, and the number of the parts thereof to be reduced.

The boundary surface E1 may not be parallel with the other boundary surfaces E2–E4.

According to the present invention described above, the housing is formed by combining a plurality of sections in which all of the boundary planes extend in parallel with one another and at right angles to the axis of the transmission. Therefore, the housing can be assembled very easily, and, moreover, the assembling accuracy can be much improved. In addition, the housing can be sealed at its boundary surfaces very easily and satisfactorily. Since the boundary surfaces do not vertically cross the bearing-carrying portions of the housing, the rigidity of these portions can be kept high, so that each shaft can be supported firmly. This contributes much to the smooth transmission of power.

It is readily apparent that the above-described housing for a driving gear for all-wheel-drive vehicles meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A drive gear for all-wheel-drive vehicles, comprising a transmission provided with a plurality of shafts parallel with the wheel axles, an interaxle differential gear having an axis parallel with said shafts in said transmission and adapted to output the driving force from said transmission in a divided manner, an interwheel differential gear provided coaxially with said interaxle differential gear and adapted to apply one output therefrom in a divided manner to right and left wheels which are closer to said transmission, a bevel gear train interposed between a driving shaft and said interaxle differential gear, said driving shaft being provided so as to cross the axes of said two differential gears at right angles thereto and apply the other output from said interaxle differential gear to right and left wheels which are more distant from said transmission, and a housing in which all of said parts are held, said housing consisting of a combination of first, second and third sections of which all of the boundary surfaces extend in parallel with one another and at right angles to the axes of said shafts in said transmission, said first, second and third sections being arranged along the axial direction of said transmission and in the mentioned order from said transmission toward said interwheel differential gear, said first section holding said transmission therein and having a wall which extends toward said driving shaft and which is provided thereon with a plurality of bearings for said interaxle differential gear, one shorter driving shaft connected to one output end of said interwheel differential gear, and an input shaft of said gear train, said second section being provided therein with a plurality of bearings for supporting said shafts in said transmission, said interaxle differential gear and said input shaft of said gear train, said third section being formed to include a funnel shaped portion for holding said interwheel differential gear therein, and provided with the remaining bearings for supporting said gear train.

2. A driving gear, according to claim 1, wherein a cover is provided for closing the funnel shaped portion of said third section, said cover being provided thereon with one bearing for supporting said interwheel differential gear.

* * * * *